May 15, 1934.  H. M. BICHELANI  1,958,961
DIRECTION SIGNAL DEVICE FOR VEHICLES
Filed Oct. 16, 1931
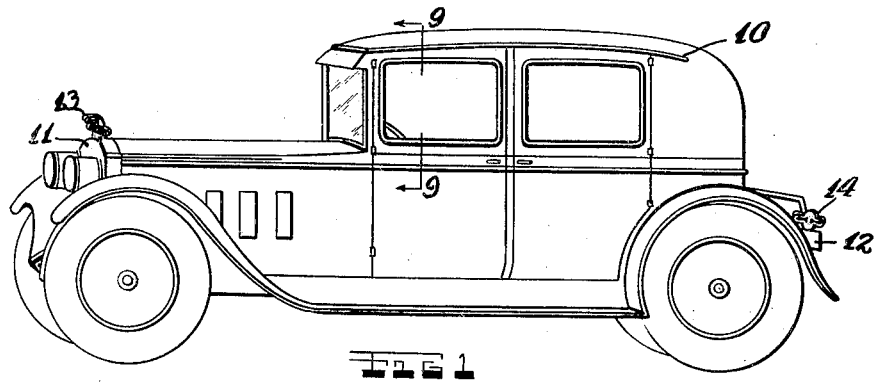
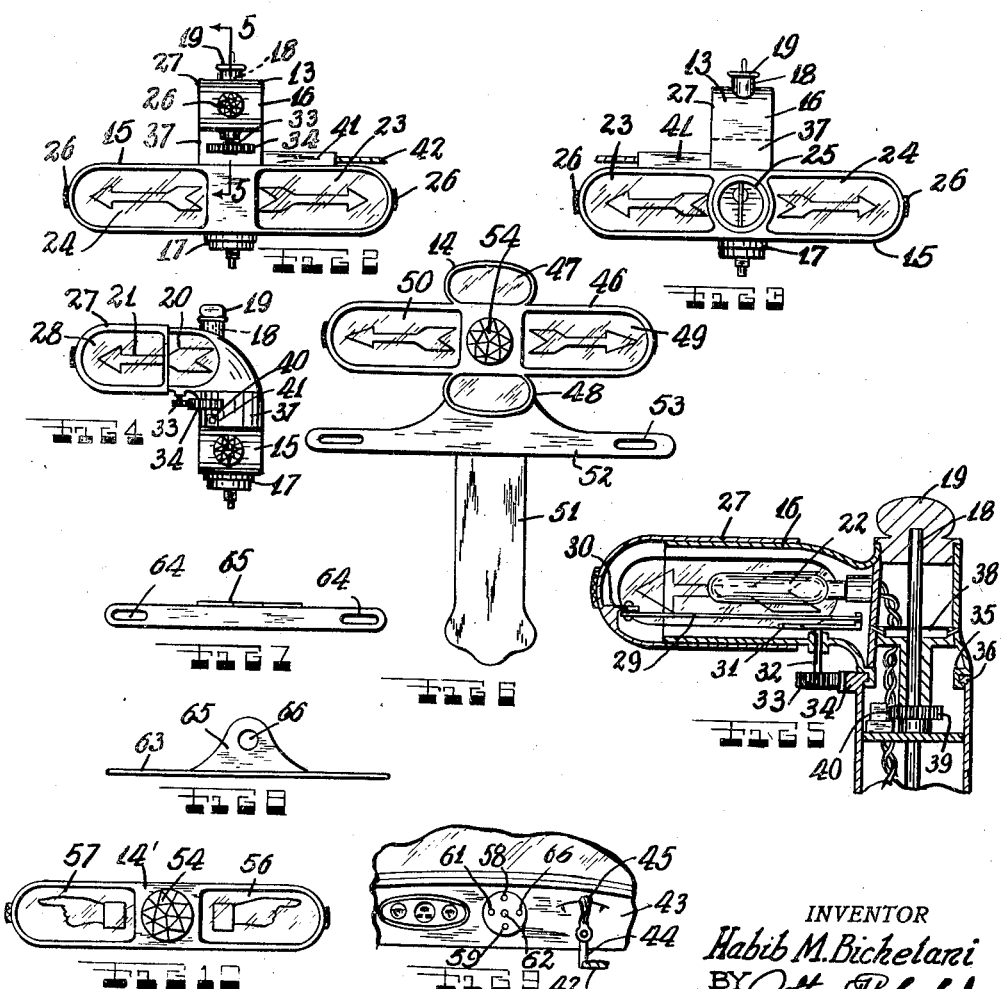
INVENTOR
Habib M. Bichelani
BY
ATTORNEY Patented May 15, 1934

1,958,961

UNITED STATES PATENT OFFICE 1,958,961

DIRECTION SIGNAL DEVICE FOR VEHICLES

Habib M. Bichelani, Bayonne, N. J.

Application October 16, 1931, Serial No. 569,192

3 Claims. (Cl. 177—329)

This invention relates to new and useful improvements in a signal indicator and has particular reference to a novel front signal indicator particularly for vehicles.

The invention has for an object the construction of a signal indicator which is characterized by a transverse portion for indicating right and left turning and a forward extending portion for indicating when the vehicle intends traveling forward.

As a further object of this invention it is proposed to construct the forward extending portion turnable so that persons to the front may notice it.

As another object of this invention it is proposed to provide a mechanism for simultaneously extending the forward extending portion as it is turned so as to increase the projected area from the front.

As a still further object of this invention it is proposed to construct a device of the class mentioned which is of simple, durable construction, dependable in use and efficient in action and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing, forming a material part of this disclosure:—

Fig. 1 is a perspective view of a vehicle equipped with signal indicators according to this invention.

Fig. 2 is a front elevational detailed view of the front signal indicator per se.

Fig. 3 is a rear elevational view of Fig. 2.

Fig. 4 is a side elevational view of Fig. 2.

Fig. 5 is a fragmentary sectional view taken on the line 5—5 of Fig. 2.

Fig. 6 is an elevational view of the rear signal indicator shown on the vehicle in Fig. 1.

Fig. 7 is a side elevational view of a bracket for supporting the front indicator.

Fig. 8 is a bottom view thereof.

Fig. 9 is a fragmentary front elevational view of a portion of the dash board of the car seen as though looking in the direction of the line 9—9 of Fig. 1.

Fig. 10 is a view similar to Fig. 6 but illustrating a modified construction.

The reference numeral 10 indicates generally a vehicle of any design shown provided with a front radiator 11 and a rear license plate 12. This vehicle is provided with other standard parts, the details of which will not be given here since they do not relate to this invention. A front signal indicator 13 is shown mounted on the water inlet of the radiator 11. A rear signal indicator 14 is shown supported upon the license plate 12. The front indicator 13 consists of a casing with a hollow transverse bottom portion 15 and a top longitudinal forward extending portion 16. A base bracket 17 for engaging upon the radiator of the vehicle is shown attached upon the bottom of the transverse portion 15. The base bracket 17 permits the indicator to be mounted upon a radiator of a vehicle as shown in Fig. 1. A water inlet connection 18 for directing water into the radiator of the vehicle is shown arranged upon the top portion 16 and is normally closed with a cover 19 or an ornament.

The longitudinal forward extending portion 16 is provided with side windows 20 on both sides having arrows 21 painted thereon for directing towards the front. These window glasses should be so painted that normally the arrows are not visible, but when a lamp 22 within the casing is illuminated, they become visible.

The transverse bottom portion 15 is provided with right hand front and rear windows 23 provided with arrows pointing towards the right and also with left hand front and rear windows 24 having arrows pointing towards the left. These windows are so painted that normally the arrows are not visible, but upon illumination of the lamps within the casing they become visible. An overheating meter 25 is shown mounted upon the rear of the transverse portion 15 of the casing so as to be readable by a driver of the vehicle. Red crystals 26 may be mounted upon the sides of the transverse portion of the casing and upon the front tip of the forward extending portion 16 so as to be visible in the dark due to reflection of light.

The forward extending portion 16 has an extendable section 27 slidably mounted. This extendable section has side glasses 28 upon which portions of the arrows 21 are formed. The arrangement is such that when the section 27 is extended, the arrows 21 are increased in length due to portions between the head and the tail being enlarged. A means is provided for automatically extending the slidable section 27 simultaneously with a slight turning of the forward extending portion 16. This means comprises a link 29 pivotally connected at one end 30 upon the front of the slidable section 27. At the other end, the link 29 is eccentrically mounted upon a disc 31 rotatively supported on a shaft 32 extending through the stationary section of the front extended portion 16 and carrying a gear 33 at its free end. This gear is in mesh with an arcuate rack 34 mounted upon a stationary portion of the casing 15. This arcuate rack has its center of curvature coinciding with the center of turning of the front extending portion 16.

The front extending portion 16 is provided with a bottom flange 35 which encircles an inturned edge 36 upon a small tubular portion 37 constituting the base of the forward projecting portion 16. The parts 35 and 36 provide for the turning of the front extending portion 16. A collar 38 is rotative upon the water pipe 18 and is in rigid connection with the rotatable forward extending portion 16. This collar carries a gear 39 which is in mesh with a rack 40 slidably mounted within a case 41 mounted upon the top of one of the transverse wings of the bottom portion 15. A flexible cable 42 connected with the rack and extends to the dash-board 43 of the vehicle. The cable is connected upon a radial arm 44 connected with a handle 45 working across the front of the dash-board so as to be movable in one or the other direction to correspondingly move the cable and cause the forward projecting portion 16 to turn slightly in one or the other direction. As the forward extending portion turns, the gear 33 will ride over the arcuate rack 34 and cause the disc 31 to turn so as to extend the slidable section 27. Thus, in addition to being slightly turned, the forward projecting portion is extended to increase the projected sides of the indicating arrow.

The rear indicator 14 is shown in detail in Fig. 6 and consists of a casing having a hollow transverse portion 46, a top chamber 47 and a bottom chamber 48. The transverse portion of the casing is provided with a right window 49 having an arrow pointing to the right when onlookers view the vehicle from the rear and a left window 50 with an arrow pointing towards the left when the vehicle is also viewed from the rear. A support bracket is shown for supporting the casing upon the license plate 12 and comprises a vertical arm 51 for engaging the license plate 12 and a horizontal top arm 52 formed with slots 53 for attachment to the license plate for serving as a support. A crystal 54 is mounted upon the casing of the rear indicator for reflecting light in the dark. The chamber 47 should be provided with a window displaying the customary "Stop" sign. The chamber 48 should be provided with a window constituting the customary tail light.

In Fig. 10, a modified form of rear indicator has been disclosed and referred to by reference numeral 14'. This indicator is shown without a tail or stop light. It is provided with a right hand window 56 having a hand pointing towards the right and a left hand 57 with a hand pointing towards the left. In other respects, this form is identical to the form illustrated in Fig. 6. The dash-board 43 is provided with several switches for operating the indicating signals. More particularly, it is provided with a top switch 58 for supplying the stop light, a bottom switch 59 for operating the tail light, a right switch 60 for controlling the illumination of the arrows which point towards the light, both in the front and rear indicators, and a left switch 61 for controlling the illumination of the arrows pointing towards the left. Automatic switches may be arranged upon the steering collar for automatically illuminating the right and left arrows of both the front and rear indicators when the vehicle is being steered towards the right or left. Such wiring is customary construction and therefore is not disclosed in the specification. A central switch 62 is for the purpose of controlling the lamp 22 for indicating straight ahead of the vehicle.

When coming to the intersection where approaching traffic wishes to make a left turn, it is desirable to inform this traffic of your intentions to proceed straight through. To do this the switch 62 should be operated to light the lamp 22 for illuminating the arrows 21 and the handle 45 should be oscillated so as to oscillate and extend and contract the arrows 21 in order to bring attention to the signal. The arrow 21 should then be brought to rest in a position pointing straight ahead so as to clearly show your intentions to proceed straight through.

The front indicator 13 may be supported upon the front license plate of the vehicle 10 by the use of a bracket, as shown in Figs. 7 and 8. This bracket consists of a transverse strip 63 with end slots 64 for engaging bolts holding the license plate in place and is provided with a forward projecting arm 65 having an aperture 66 for receiving the bracket 17.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a directional signal device for vehicles, a support, a forward extended portion having a slidable section upon its front capable of being extended, a signal opening on each side of the forward extended portion, said opening being enlarged upon extension of the slidable section, means for swivelly mounting the forward extended portion on the support, means for turning said forward extending portion to the right and left, and means for extending the slidable section by motion of the forward extended portion when the forward extended portion is turned.

2. In a directional signal device for vehicles, a support, a forward extended portion having a slidable section upon its front capable of being extended, a signal opening on each side of the forward extended portion, said openings being enlarged upon extension of the slidable section, means for swivelly mounting the forward extended portion on the support, means for turning said forward extending portion to the right and left, and means for extending the slidable section when the forward extended portion is turned, comprising a shaft rotatively mounted in the forward extended portion, a disc fixed upon the shaft, a link connected with the front section and eccentrically connected with the disc, and means for rotating the shaft by the turning of the forward extended portion.

3. In a directional signal device for vehicles, a support, a forward extended portion having a slidable section upon its front capable of being extended, a signal opening on each side of the forward extended portion, said openings being enlarged upon extension of the slidable section, means for swivelly mounting the forward extended portion on the support, means for turning said forward extending portion to the right and left, and means for extending the slidable section when the forward extended portion is turned, comprising a shaft rotatively mounted in the forward extended portion, a disc fixed upon the shaft, a link connected with the front section and eccentrically connected with the disc, and means for rotating the shaft by the turning of the forward extended portion, comprising an arcuate rack fixed upon said support, and a pinion fixed upon said shaft and engaging said arcuate rack, said arcuate rack being curved so that its center of curvature coincides with the point about which the forward extended portion swivels.

HABIB M. BICHELANI.